United States Patent Office 3,200,820
Patented Aug. 17, 1965

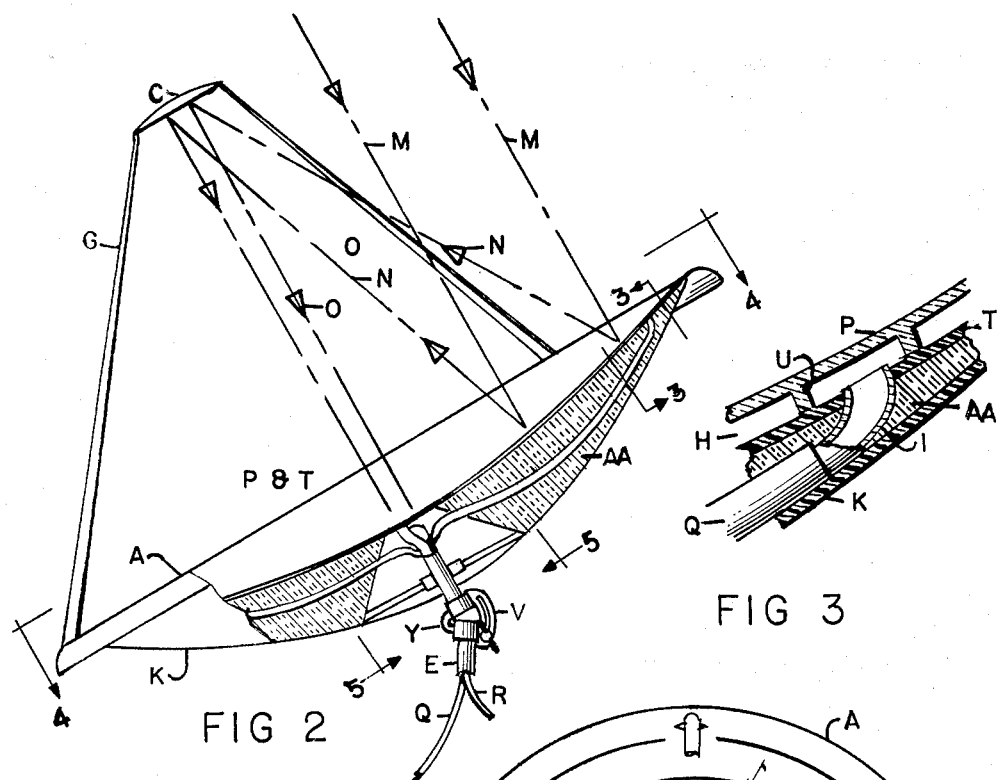
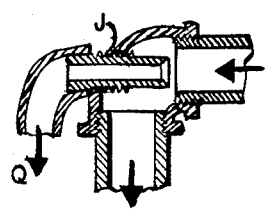
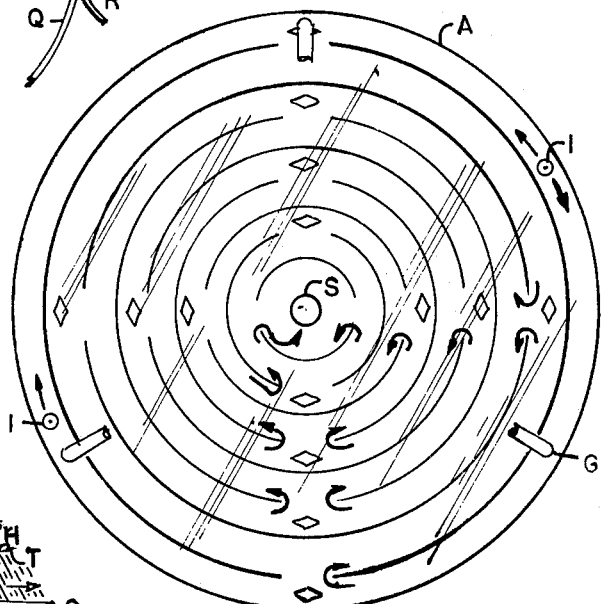
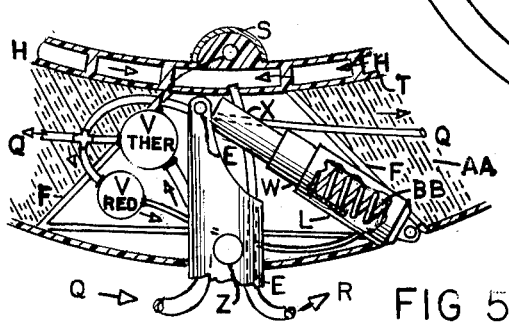

3,200,820
SOLAR ENERGY COLLECTOR
Robert Russell Garrett, Cardiff-by-the-Sea, Calif.
(5300 Satel Drive, Orlando, Fla.)
Filed Apr. 5, 1962, Ser. No. 185,449
3 Claims. (Cl. 126—271)

This invention relates to a thermal collector adapted for use primarily in solar heating apparatus and to mechanism for directing the collector toward the sun.

One object of my invention is to provide a novel system, similar in appearance but dissimilar in theoretical function, to existing solar focusing mirrors which invention more than doubles the efficiency of existing systems.

Another object of my invention is to utilize new materials and methods of manufacture for improved efficiency, cost, and transportation.

A third object of my invention is to provide a simple, inexpensive, automatic mechanism for directing the collector toward the sun which is a necessary requisite to the basic idea.

To the accomplishment of these objects, I provide means to support the basic collector in attractive fashion doubling as an umbrella shade, and to automatically drive the collector diurnally to maintain its perpendicular relationship to the sun.

My invention further relates to arrangements and combinations of assemblies which will be hereinafter described and more particularly depicted in the appended claims.

A preferred form of my invention is shown in the drawings in which:

FIG. 2 is a detail side view with partial section taken along the diameter perpendicular to the daily motion of the sun.

FIG. 3 is a magnified portion of the section of FIG. 2 encompassed by 3—3 in FIG. 2.

FIG. 4 is a plan view of the collector in the direction shown by 4—4 in FIG. 2. This view shows an arrangement of liquid flow path from entrance to drain.

FIG. 5 is a magnified detail of 5 in FIG. 2 rotated 90° to show mechanism causing rotation of the collector to follow the daily movement of the sun.

FIG. 6 is a typical section of a pipe elbow in a swimming pool pump recirculation system showing a velocity heat pitot bypass connection.

Figure 1:
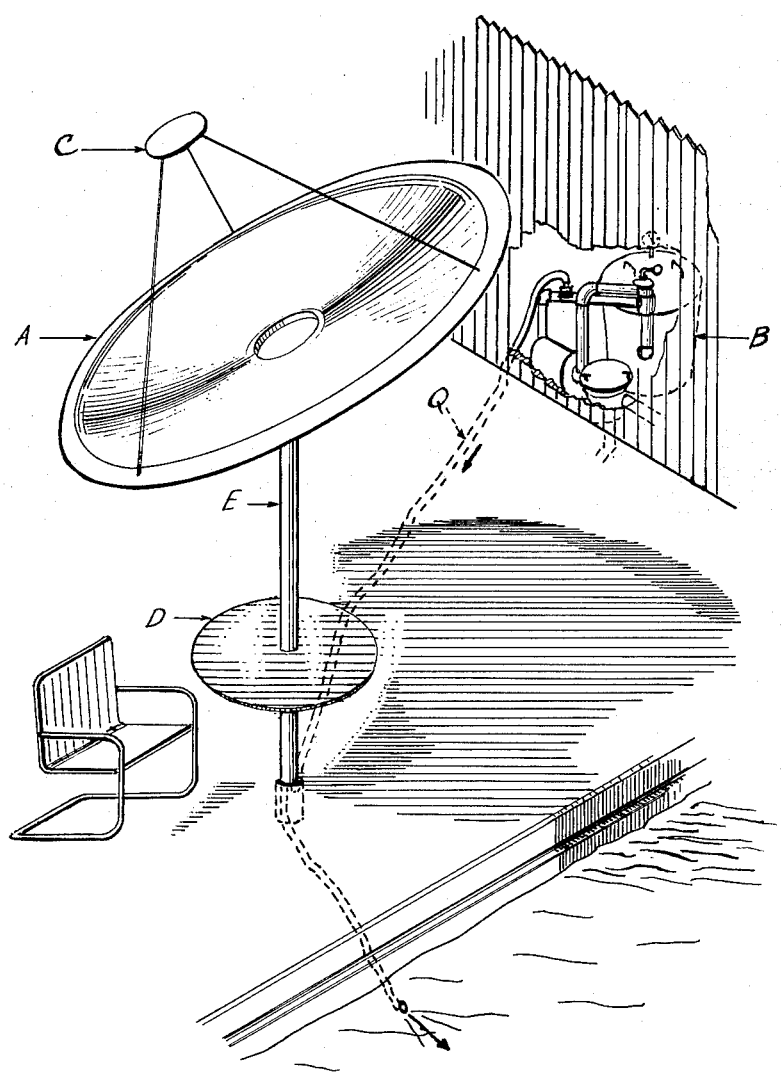
FIG. 1 is a perspective view of my solar energy collector installed as a swimming pool heater.

I will first describe the construction of my solar energy collector, then its theory, and finally the details of its mechanisms.

My improved solar collector consists of a shallow parabolic dish A eight feet in diameter whose surface film P exposed to the direct rays of the sun consists of a clear plastic layer, 10% glass fiber mixed with polyester resin. Beneath this film P the same material mixed with 5% lamp black is used to form a similar layer T. These two layers have concentric, annular lands U which form contact and adhesive surfaces to hold layers P and T together forming water-proof barriers or baffles around which liquids or gases may flow between the two layers of films.

Beneath this sandwich P and T an additional layer K of woven fiberglass and polyester forms a high strength back for structural support of the parabolic sandwich P and T. Within the cavity between PT and K polyurethane or styrofoam AA is foamed in place to provide additional stiffness and insulation.

Basic support for A is provided by a 2½ inch iron pipe E buried in the ground or appropriately grouted extending thence to the central section of A into the cavity as shown in FIG. 5. This pipe forms the housing for hoses Q and R described later. E is cut and hinged at Y to provide tilt adjustment at V. V is a radially slotted member welded to the upper pipe through which a wing nut clamps from a bracket welded to the lower section of pipe E. V is indexed from 0° to 23° with the words "summer," "spring & fall," and "winter" to indicate to an operator the proper seasonal clamp position. D is a table beneath the shade of the heater and B is a typical pool pump connected to hose Q.

Inlet hose, ⅝ inch, Q terminates at the inlet to a thermal valve through a clearance slot in E. Outlet hose R terminates on the central drain hole of layer T, (see FIG. 5). Two hoses Q from the outlet in thermal valve are ducted through a cavity in the foam plastic AA to peripheral inlet elbows I. These are ½ inch size. A third outlet ¼" size from the thermal valve goes to a needle or reducing valve where a minute amount of flow is ducted to the double acting cylinders L, W and X. A thermal valve is actuated on or off by thermal bulb S mounted in the center of layer P by means of an epoxy adhesive.

A typical support structure F consists of a quadrant of ⅜ inch pipe welded together and held in place by the overlap of the fiberglass layer K. A support pin Z thru pipe E is slotted to receive both sides of structure F and with proper spacers allows A to pivot 120° following the daily travel of the sun. Cryolite plastic cylinders L, W and X hinged on F at one end and pinned to support pipe E at the other end provides an expansion mechanism to pivot A. Within these cylinders, tension spring BB provides collapsing power to L, W and X.

An optically flat mirror C one foot in diameter is mounted on a tripod support structure such as G several inches short of the focal length of parabola A and concentric with the axis of the parabola. This mirror may be constructed of flat plastic with an aluminized surface or be a very thin silvered mirror.

The theory of the function of my improved solar collector is of primary importance. Quanta of energy M from the sun is absorbed to a maximum extent by any blackened flat surface perpendicular to the source of energy (sun). Such a flat surface is represented by layer T of A. Any heat exchange medium (liquid, gas, or solid) such as water passing over this blackened surface will pick up heat energy and translate the heat to a storage device such as a hot water tank or swimming pool. Air passing over the water is undesirable since it evaporates and cools the heat exchange medium, so a confining transparent film P is interposed between the quanta of sun energy and the black film T. However, any transparent solid will reflect up to 50% of the energy, which heretofore has been wasted and lost. This reflected energy N is captured by mirror C and re-reflected shown at O into the collector film T where 50% of the 50% reflected energy or 25% is picked up in the water. This occurs again causing 50% of the 25% energy to be regained or 13½%, totaling 88½% thermal energy efficiency. An expensive refinement of the shape of C would add another 6½% for a total of 95% efficiency, but practical commercial practice precludes this refinement.

The combination of collector principles and reflector principles to attain this excellent efficiency is the basis of all mechanisms in this invention. The illustrated method of one practical application is but one of many approaches to this theory, which I believe makes solar energy practical for the betterment of mankind.

The operation of my invention is as follows: Assuming the adjustment and alignment of A coincides with the rising of the sun at any one of the three principal seasons of the year, the rising sun's energy impinges upon the collector at a nearly perpendicular angle. No water is flowing thru the collector at this moment, so a portion of the reflected heat is concentrated by reflection on the thermal bulb S embedded in clear plastic at the center of the collector. S is warmed to a temperature of 110° F. actuating the thermal valve to its open position. A static pressure of eight to sixteen p.s.i.g. existing to hose Q is then allowed to flow through the valve where a flow of approximately six g.p.m. is divided to the two inlets I. 1/1000 part is ducted to a regulating valve described later. Water entering the two inlets I would be divided equally if A were level (noon position) or proportioned more to the lower inlet otherwise. The existance of the two inlets is important to maintain a full condition of the annular rings H between P and T for equal cooling of the plastic layers with the arrangement of lands U shown. With higher inlet pressures or lower flow rates, a single spiral arrangement of land U is preferred, thus eliminating the need for more than one inlet. The design shown is for optimum conditions set up from a velocity head pitot pickup "j" in an average swimming pool recirculation system. Water from inlets I flows in decreasing annular paths shown in FIG. 4 to a central 3/4 inch drain R where it is ducted through a hose to a heat storage tank such as the swimming pool shown. During its passage through the sandwich P and T, the liquid absorbs heat from sunlight passing through P and from the surface T thus increasing its temperature from ambient inlet (perhaps 65° F.) to a 10° higher temperature (75° F.) upon exit. The annular cross section H of the water is maintained as thin as possible consistant with allowable pressure drop conditions to spread out the coolant over as large a heat pickup surface as possible. In the case shown, the dimensions are 1/8 inch deep by six inches average between lands U. The increase of temperature over the ambient outside temperature of the coolant from the outside periphery to the center of A requires an increase of thickness of insulation to maintain a low loss of heat through the back of A. The foam plastic AA shown in FIG. 2 demonstrates a typical arrangement of insulation.

The mounting and function of mirror C has been sufficiently described heretofore. If manufacturing techniques are held accurately enough, no adjustment of this mirror with respect to the parabolic dish A is required. G is shown as a tapered bar.

The minute amount of flow from the thermal valve adjustable through the reducing valve is ducted to cylinders L, W, and X to expand these members linearly at a slow and consistant rate. This is the time-motion mechanism rotating A through a daily cycle to maintain its perpendicularity to the sun. Cylinders L, W and X are hollow cryolite plastic nesting tubes with O-rings or seals placed on the ends of X and L. The extreme ends of X at its pivot point and L at its pivot point are blocked off with plastic plugs. As pressure and flow is applied from the reducing value, the cylinder assembly expands forcing its two pivot points apart. One pivot on X is mounted on the support pipe E which is fixed with relation to the ground, the other pivot on L is mounted on structure F which is a body and part of the dish A. With L, W and X fully contracted A would be forced to tip to the left (FIG. 5). If L, W and X were fully extended, A would be forced to tip to the right. A spring BB serves to collapse the cylinders when no fluid pressure exists and tips A to the left in the direction of the rising sun. The reducing value orifices water flow to the cylinders to turn A at an adjusted rate set once during installation to allow for a particular system parameters of pump size, length of hoses, pressure variations, prevailing winds, and pitot placement. Once adjusted for these average conditions, no further adjustment should be required; since momentary variations will integrate and average its own corrections automatically. The basic collection and reflecting system does not require extreme accuracy as do parabolic concentration systems and small variations in following the sun is not necessary.

As the sun sets, thermal bulb S cools thus closing the thermal valve and all water flow through the collector A and the actuating mechanisms L, W, and X. A small fixed leak orifice in X, calibrated in drops per minute, allows liquid collected in the cylinders to be squeezed out from the collapsing pull of spring BB. The cylinders slowly contract during the night readjusting A to its early morning position. Since the leak orifice is placed in the uppermost position of the collapsed cylinders, no air is trapped and the cylinders remain full of liquid allowing a more rapid response to the morning sun when the cycle is repeated.

In the summer months, the sun passes close to the zenith and declines toward the horizon to a maximum of 23° in the winter. To compensate for this change a manual or mechanised adjustment is required 90° from the axis of daily rotation. I have provided pivot point Y and a slide V as one method to obtain this adjustment. A jack screw with a crank handle or motor would be an alternate method for seasonal adjustment. Slide V is marked in 7½° increments for summer, spring and fall, and winter adjustment in the United States. Such a scale is desirable regardless of the type of mechanism to set the seasonal tilt.

I have described in detail the device for a highly efficient Solar Energy Collector and the mechanism for maintaining the collector adjustment with relation to the sun. It may be seen that I have accomplished the objects of my invention: to improve the efficiency of existing systems by a new device different from any known collector or reflector; I have used new, modern materials for its construction; and I have provided several simple inexpensive mechanisms to drive the collector with relation to the sun.

Having thus described my invention and some of the more distinct advantages thereof, I do not wish to be limited to the details herein disclosed, otherwise than as set forth in the claims, but what I claim is:

1. A solar heat collector comprising a transparent parabolic film, a darkened film underlying said transparent film, means supporting said films to receive solar radiation, means forming fluid flow passages between and in heat exchange relation with said films, means for passing heat exchange fluid through said passage, and reflector means spaced forwardly of said transparent film for returning to said film solar rays reflected from said transparent film.

2. The solar heat collector described in claim number 1 encompassing an automatic drive mechanism consisting of means for capturing a portion of the flow and pressure of the heat exchange fluid to produce expansion and to provide apparent motion to the collector in harmony with the motion of the sun with respect to the earth.

3. The solar heat collector driven diurnally with means described in claim 2 with the addition of a mechanical adjustment device for the apparent seasonal rise and fall of the sun with respect to the earth.

References Cited by the Examiner

UNITED STATES PATENTS

| | | | |
|---|---|---|---|
| 1,951,404 | 3/34 | Goddard | 126—270 |
| 2,182,222 | 12/39 | Courtis et al. | 126—270 |
| 2,798,478 | 7/57 | Tarcici | 126—270 |

FREDERICK L. MATTESON, Jr., *Primary Examiner.*

PERCY L. PATRICK, JAMES W. WESTHAVER,
*Examiners.*